(12) United States Patent
Lan

(10) Patent No.: US 11,648,871 B1
(45) Date of Patent: May 16, 2023

(54) CIRCULAR CAR SIDE LED PROJECTION LAMP

(71) Applicant: Min-Chang Lan, Taoyuan (TW)

(72) Inventor: Min-Chang Lan, Taoyuan (TW)

( * ) Notice: Subject to any disclaimer, the term of this patent is extended or adjusted under 35 U.S.C. 154(b) by 0 days.

(21) Appl. No.: 17/567,898

(22) Filed: Jan. 4, 2022

(51) Int. Cl.
| | | |
|---|---|---|
| B60Q 1/26 | (2006.01) | |
| F21V 23/00 | (2015.01) | |
| F21V 5/04 | (2006.01) | |
| F21V 3/02 | (2006.01) | |
| F21Y 115/10 | (2016.01) | |
| F21V 8/00 | (2006.01) | |
| F21Y 105/18 | (2016.01) | |
| G08B 5/36 | (2006.01) | |

(52) U.S. Cl.
CPC .............. *B60Q 1/2615* (2013.01); *F21V 3/02* (2013.01); *F21V 5/04* (2013.01); *F21V 23/003* (2013.01); *F21Y 2105/18* (2016.08); *F21Y 2115/10* (2016.08); *G02B 6/0021* (2013.01); *G08B 5/36* (2013.01)

(58) Field of Classification Search
CPC ... F21Y 2105/18; B60Q 1/2615; F21K 9/232; G08B 5/36
See application file for complete search history.

(56) References Cited

U.S. PATENT DOCUMENTS

| | | | | |
|---|---|---|---|---|
| 2007/0091615 A1* | 4/2007 | Hsieh | ................. | G02B 19/0014 |
| | | | | 257/E33.073 |
| 2013/0335966 A1* | 12/2013 | Yokota | .................... | F21K 9/232 |
| | | | | 362/294 |
| 2017/0009952 A1* | 1/2017 | Tai | ........................ | F21S 41/322 |
| 2017/0211750 A1* | 7/2017 | Yotsumoto | .......... | F21V 33/0056 |
| 2017/0254487 A1* | 9/2017 | Matsubayashi | .......... | F21K 9/61 |
| 2017/0365136 A1* | 12/2017 | Torre Sarmiento | ....... | F21K 9/68 |
| 2019/0257486 A1* | 8/2019 | Hiramatsu | ............. | F21S 8/081 |

\* cited by examiner

*Primary Examiner* — Oluseye Iwarere
*Assistant Examiner* — Michael Chiang
(74) *Attorney, Agent, or Firm* — Fei-hung Yang

(57) ABSTRACT

A circular car side LED projection lamp installed onto a car body and used as a warning light includes a lamp base, a light panel, a light guide frame and a lamp cover. Both light panel and light guide frame are installed in the lamp base, covered by the lamp cover, and connected to the lamp base. The light panel has a drive circuit and plural first LEDs connected to the drive circuit, spaced from each other, and arranged on at least two opposite sides of the light panel. The light guide frame is covered onto the light panel, and two opposite sides of its inner frame perimeter are in a serrated shape with convex teeth extending downwardly to form a light guide part which is covered onto each first LED to receive and guide a beam from each first LED to form a side light.

9 Claims, 15 Drawing Sheets

10

10

10

10

10

10

10

CIRCULAR CAR SIDE LED PROJECTION LAMP

BACKGROUND

Technical Field

The present disclosure relates to a car side LED lamp (marker light or stop turn & tail light), and more particularly to the circular car side LED projection lamp capable of improving the overall brightness of the lamp and the warning effect of the car side lamp by a slightly curved light guide column, so as to improve the safety of driving and achieve the effect of increasing the economic value of the lamp product.

Description of Related Art

In general, trucks, containers, and large transportation motor vehicles have a longer car body, so that these motor vehicles have automotive lamps installed at the front and the rear of the motor vehicles to warn or inform other vehicles, but the automotive lamps are usually affected by the long car body and the notification effect is often limited by the other vehicles driving in the front of or behind these motor vehicles. In other words, these motor vehicles are affected by the car body with a considerable length, and the drivers of the other vehicles driving on the side of these motor vehicles cannot see the warning lights installed at the front and rear of these motor vehicles clearly, and thus failing to provide the warning effect or make it for people and other vehicles to recognize these motor vehicles in dim weather or when making a turn on a curve road, and it is not easy for the people and other vehicles at the side of these motor vehicles to recognize or dodge these motor vehicles or slow down, and thus leading to car accidents such as collisions. In order to solve such frequent accidents, the motor vehicles with a longer car body are often attached with reflective stickers or reflectors on both sides of the car body to remind other vehicles by the reflected light, or installed with a siren to produce alarm sounds to alert the pedestrians or other vehicles, so as to achieve the effects of reducing car accidents and improving the safety of driving.

However, the intensity of the light reflected by the aforementioned reflectors is related to the intensity of the projection light received by the reflectors, so that if the distance from other vehicles is far or the illuminance of the automotive lamp is weak, then the warning effect will be limited. In view of the above drawbacks, it is a main subject of the present disclosure to provide a warning light with high-intensity side light, and actively emit light while ensuring that other vehicles around these motor vehicles can directly and clearly identify the light, in order to overcome the drawbacks of the prior art.

SUMMARY

In view of the aforementioned problems, it is a primary objective of the present disclosure to provide a car side LED lamp (marker light or stop turn & tail light) that uses a slightly curved light guide column to guide the beam of a light emitting diode (LED) to emit sideway to achieve a high-intensity circular projection light effect, in order to enhance the practical effect of warning light on the side of the car and ensure the safety of the user's life and property.

To achieve the foregoing and other objectives, the present disclosure discloses a circular car side LED projection lamp, installed onto a car body and used as a warning light, comprising: a lamp base; a light panel, installed in the lamp base, and having a drive circuit and a plurality of first LEDs electrically coupled to the drive circuit and spaced and arrange on at least one pair of opposite sides of the light panel respectively; a light guide frame, installed in the lamp base and covered onto the light panel, and the two opposite sides of an inner frame perimeter of the light guide frame being configured to be in a serrated shape and having a plurality of convex teeth, and each of the convex teeth extending downward with a curvature to form a light guide part, so that each of the light guide parts is covered onto each of the first LEDs to receive a beam emitted by each of the first LEDs and guide the beam to provide a side light; and a lamp cover, covered onto the light panel and the light guide frame, and coupled to the lamp base.

Wherein, at least one selected from a side of the lamp cover, a peripheral side of the light guide frame, and the bottom of the light guide part has an optical diamond structure provided for scattering the beam of the first LEDs again. The optical diamond structure is a convex lens structure. The light panel further comprises a plurality of second LEDs spaced from one another and arranged in a middle area of the light panel. The lamp cover has a plurality of first mesh dots disposed in a central area of an inner side thereof and configured to be corresponsive to the second LEDs respectively, and a plurality of engraved marks radiating outwardly from the perimeter of the central area. The lamp cover has a reticulated structure disposed in a central arear of an outer side thereof and configured to be corresponsive to the first mesh dots. The lamp base having a groove has a ripple structure disposed at the periphery of the lamp cover and fixed to the lamp base through the ripple structure.

In another embodiment, the lamp cover has a plurality of second mesh dots disposed in an internal central area of the lamp cover. The second mesh dots disposed in the central area of the lamp cover central area are in a hexagonal cone shape and configured to be corresponsive to the second LEDs respectively, and the rest of the second mesh dots are in a dot shape. The light guide frame is extended to form at least one combination portion, and the light panel and the lamp base have a first combination hole and a second combination hole configured to be corresponsive to the combination portion respectively and provided for locking and fixing the light guide frame, the light panel and the lamp base with one another. The lamp cover has at least one first assembling hole, and the lamp base has a second assembling hole configured to be corresponsive to the first assembling hole, and the first and second assembling holes are provided for fixing the lamp cover and the lamp base with each other, and a recessed portion is formed at the outer frame perimeter of the light guide frame and configured to be corresponsive to the first assembling hole.

In summation of the description above, the present disclosure guides the beam emitted by the first LEDs to emit sideways by the slightly curved convex teeth and adjusts a light trail through the optical diamond structure to improve the brightness of the sideway light and form a uniform surrounding lighting effect to ensure the high-alert functionality of the product and achieve the effect of increasing the economic value of the product. In addition to the improved brightness of the side light, the present disclosure also improves the light intensity and uniformity of the forward light through the second LEDs and the mesh dots, so that the car side projection lamp (marker light or stop turn & tail light) can be used on various motor vehicles, such as bicycles, motorcycles, cars, containers, trucks or large transportation vehicles, etc. to ensure the high practicability of the product and improve the adaptability of the product.

DESCRIPTION OF THE EMBODIMENTS

This disclosure will now be described in more detail hereinafter with reference to the accompanying drawings that show various embodiments of the invention.

Figure 1:
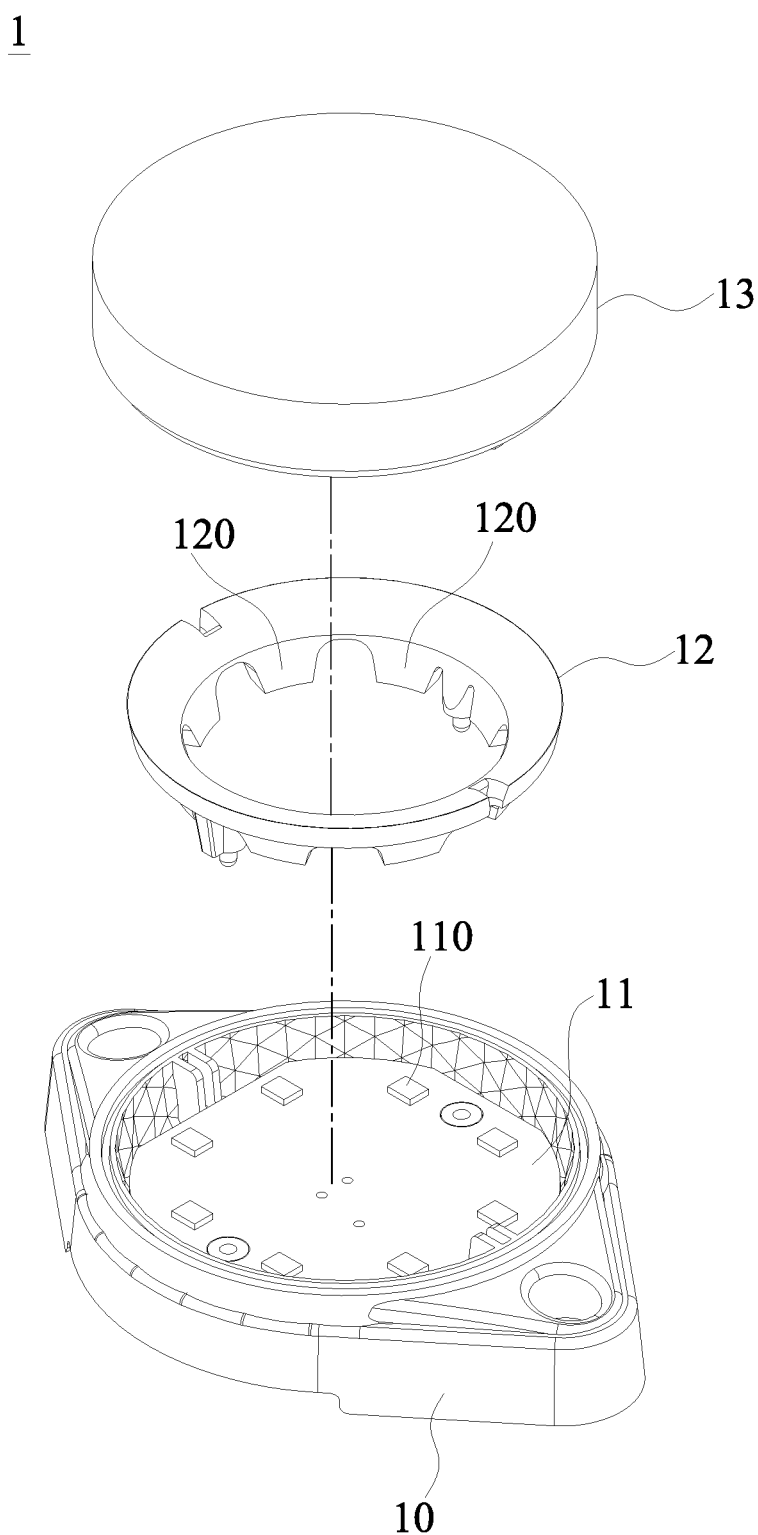
FIG. 1 is a partial exploded view of a part of a first preferred embodiment of this disclosure.
Figure 2:
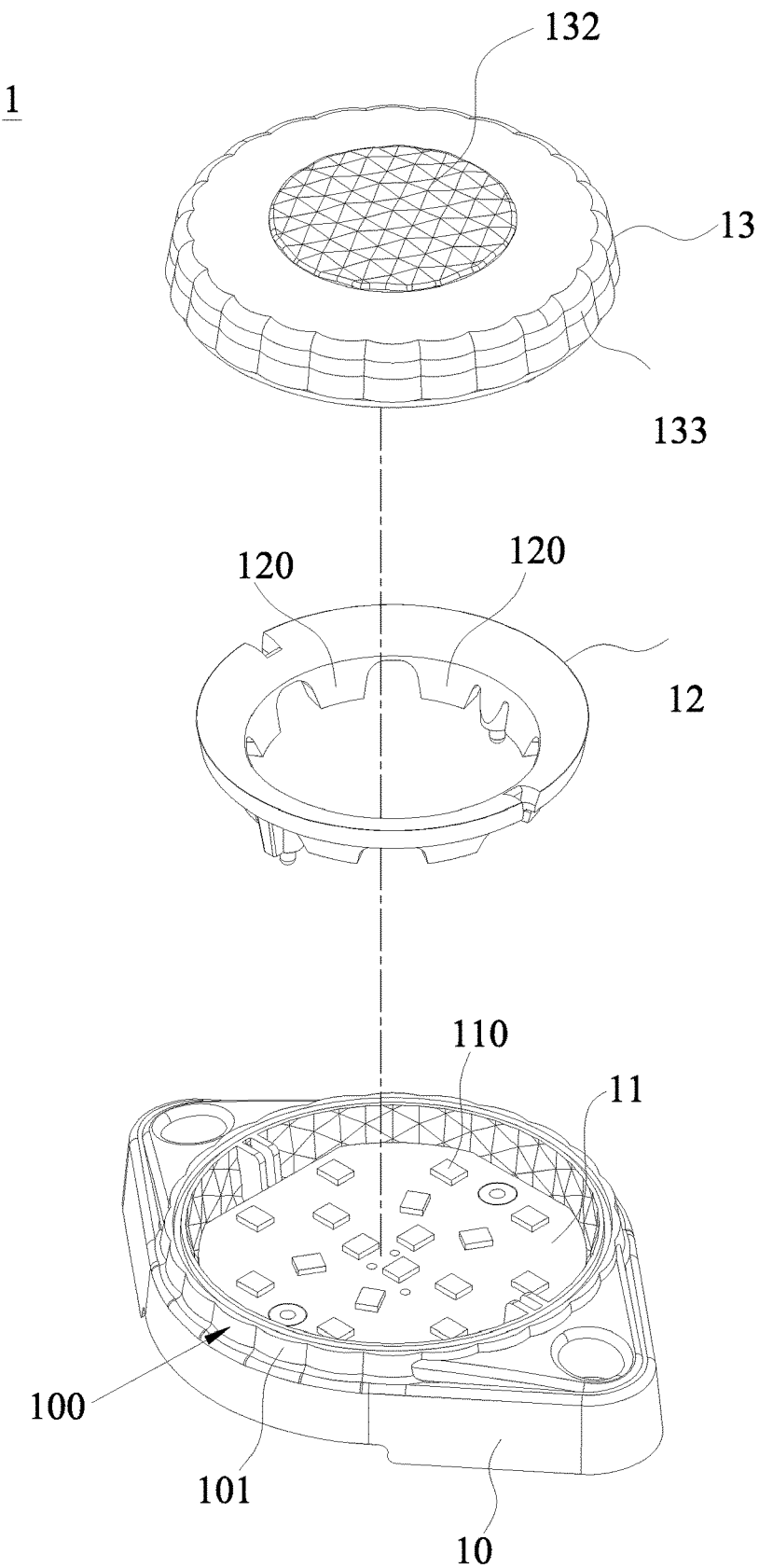
FIG. 2 is a partial exploded view of a second preferred embodiment of this disclosure.
Figure 3:
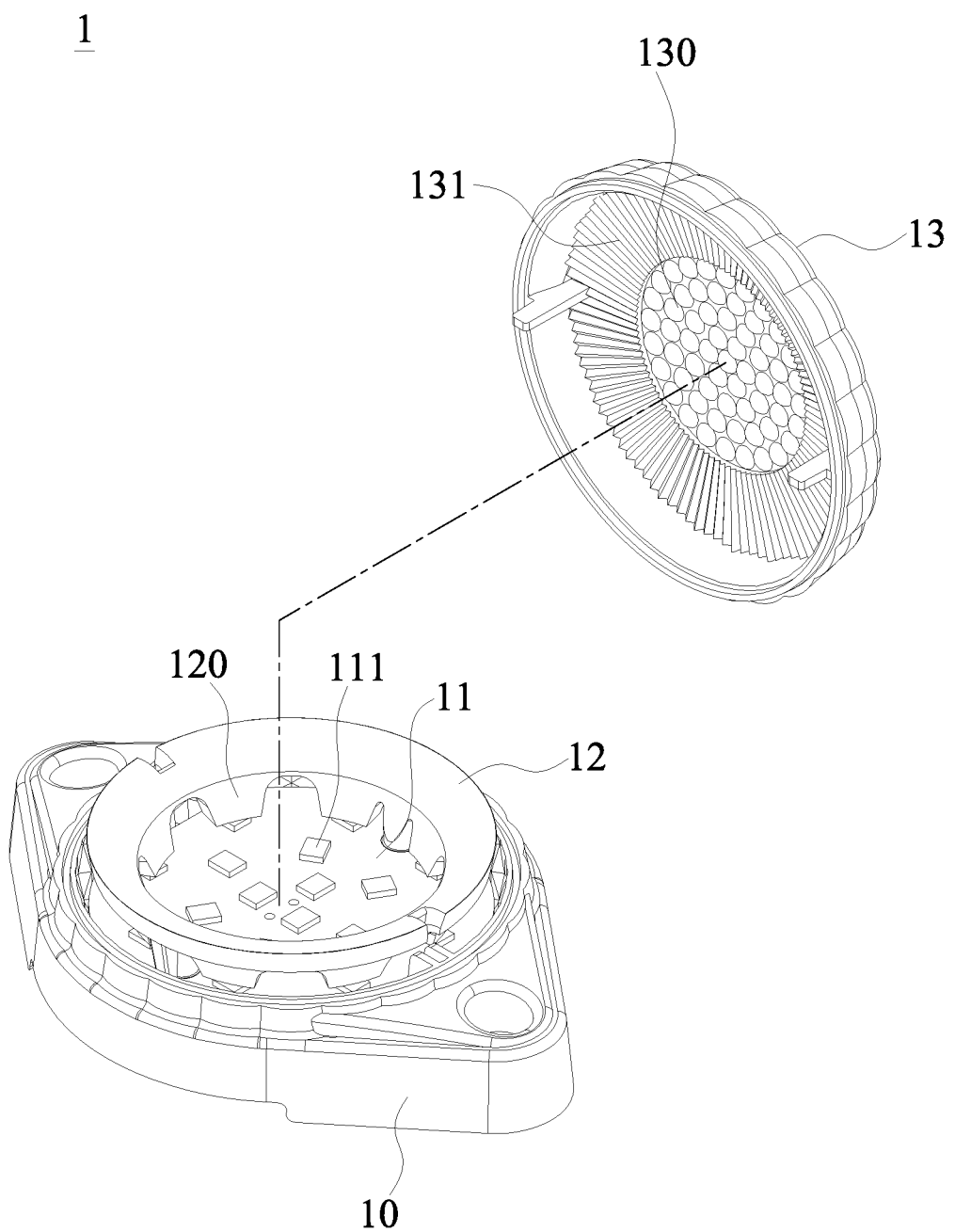
FIG. 3 is another partial exploded view of the second preferred embodiment of this disclosure.
Figure 4:
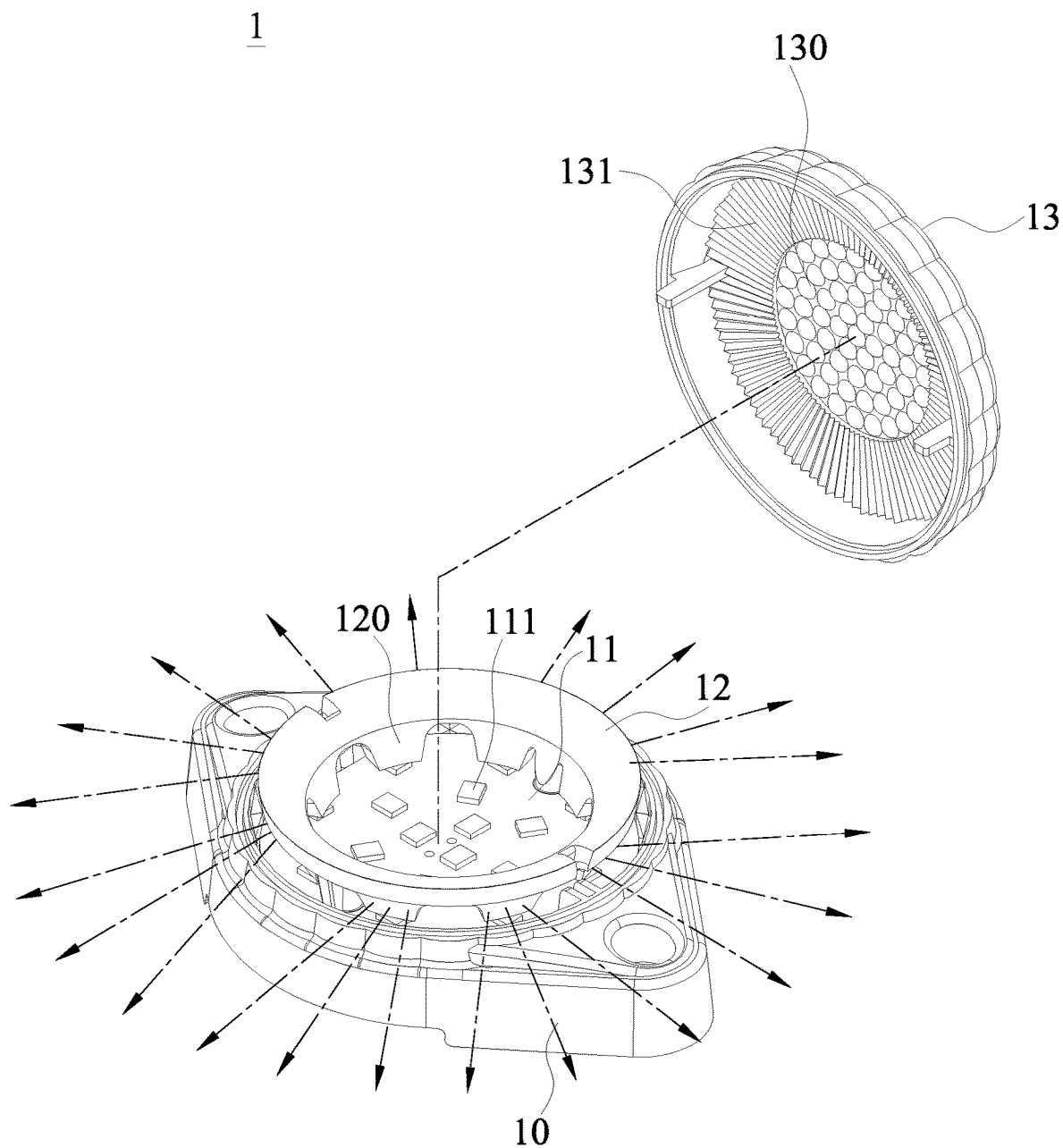
FIG. 4 is a schematic view showing a light outputted from a light guide frame of the second preferred embodiment of the present disclosure.
Figure 5:
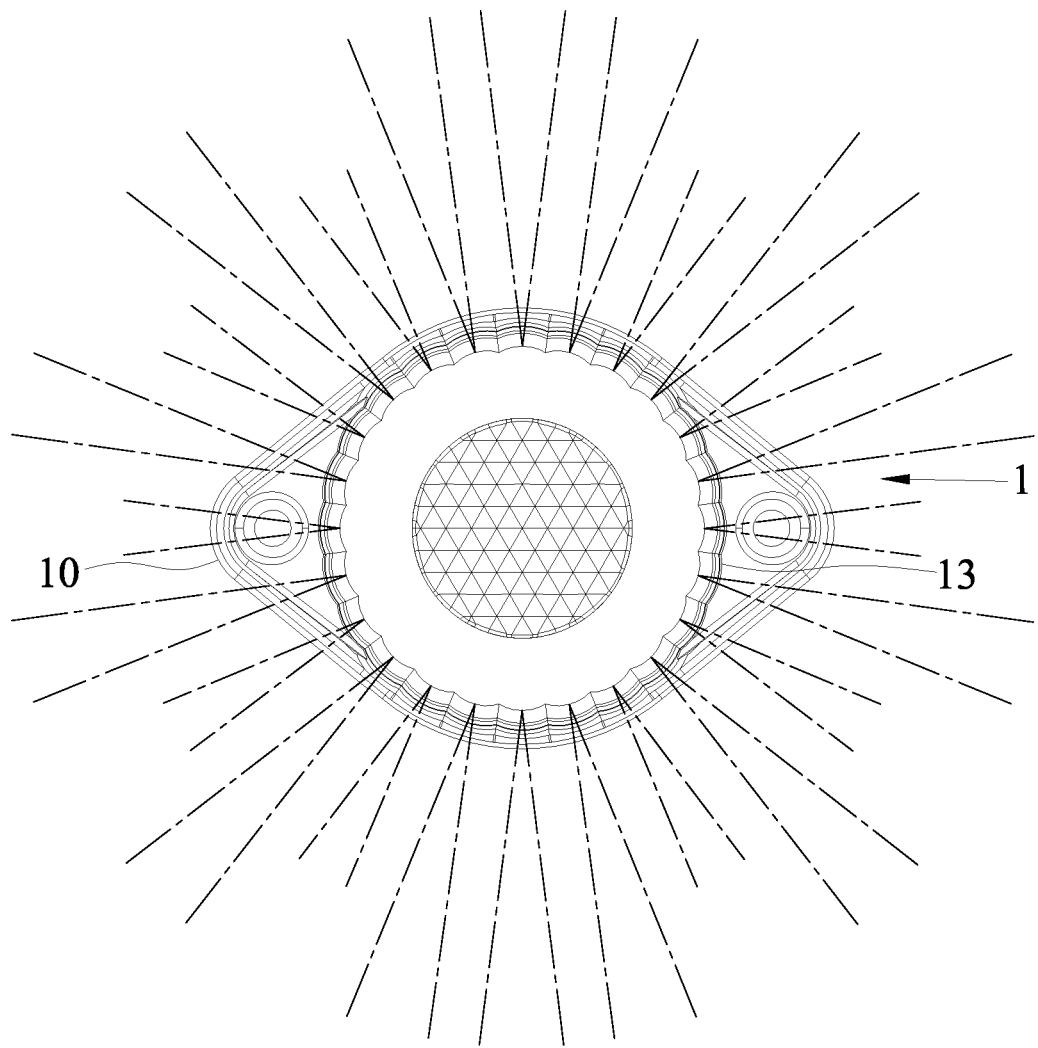
FIG. 5 is a schematic view showing a light of the second preferred embodiment of the present disclosure.
Figure 6:
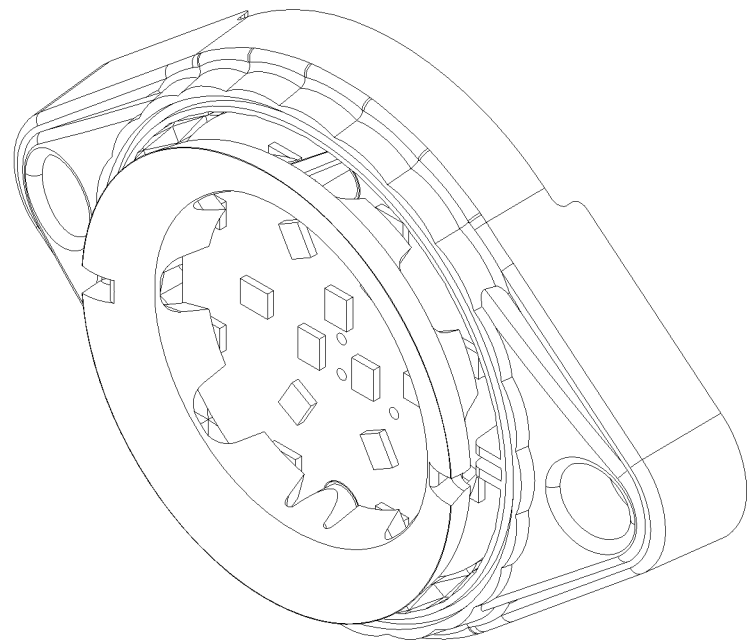
FIG. 6 is a perspective view of a part of the second preferred embodiment of the present disclosure.
Figure 7:
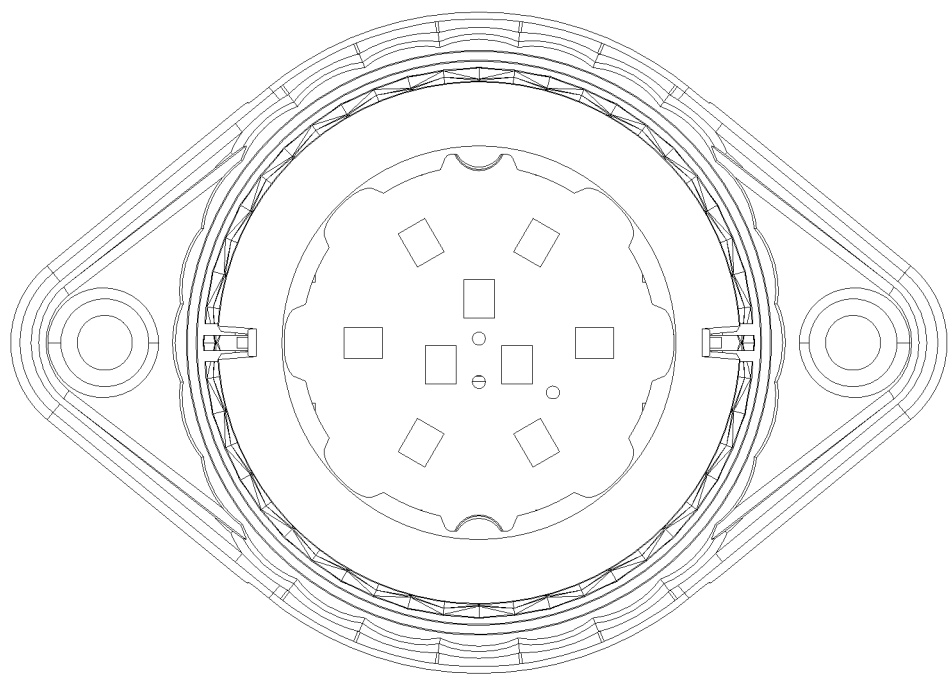
FIG. 7 is a perspective top view of a part of the second preferred embodiment of the present disclosure.
Figure 8:
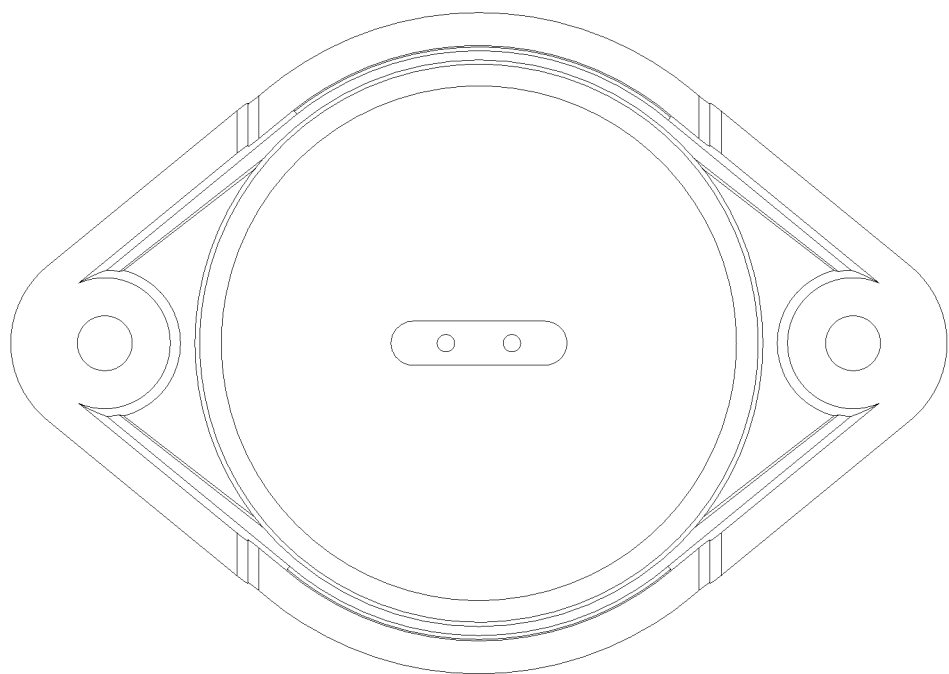
FIG. 8 is a perspective bottom view of a part of the second preferred embodiment of the present disclosure.
Figure 9:
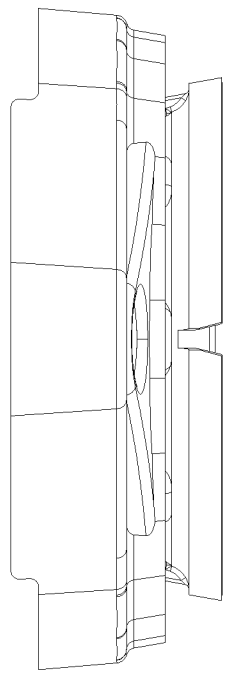
FIG. 9 is a perspective left-side view of a part of the second preferred embodiment of the present disclosure.
Figure 10:
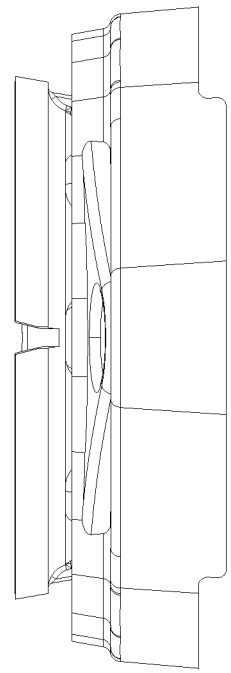
FIG. 10 is a perspective right-side view of a part of the second preferred embodiment of the present disclosure.
Figure 11:
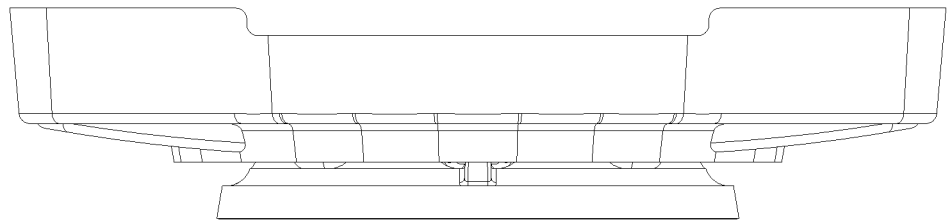
FIG. 11 is a perspective front view of a part of the second preferred embodiment of the present disclosure.
Figure 12:
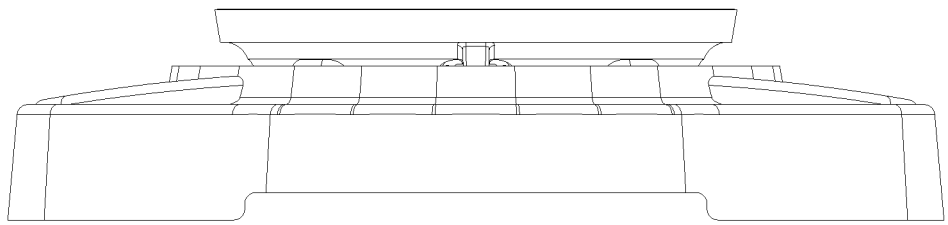
FIG. 12 is a perspective rear view of a part of the second preferred embodiment of the present disclosure.
Figure 13:
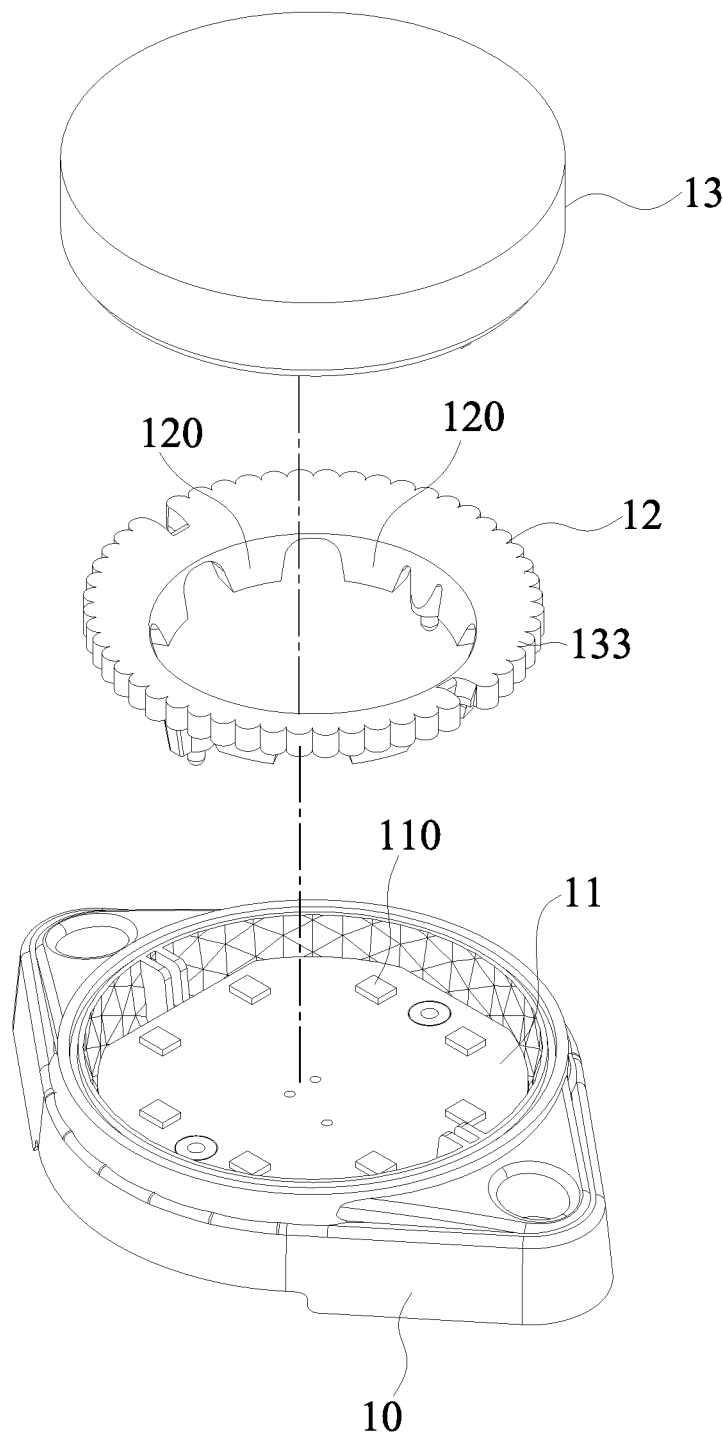
FIG. 13 is a partial exploded view of a third preferred embodiment of this disclosure.

With reference to FIG. 1 for the partial exploded view of a circular car side LED projection lamp (marker light or stop turn & tail light) in accordance with a preferred embodiment of the present disclosure, the circular car side LED projection lamp 1 is installed onto a car body and used as a warning light. The circular car side LED projection lamp 1 includes a lamp base 10, a light panel 11, a light guide frame 12 and a lamp cover 13. The light panel 11 and the light guide frame 12 are installed in the lamp base 10, and the light guide frame 12 is covered onto the light panel 11, and the lamp cover 13 is covered onto the light panel 11 and the light guide frame 12 and connected to the lamp base 10. The light panel 11 has a drive circuit (not shown in the figure) and a plurality of first LEDs 110 and the first LEDs 110 are electrically connected to the drive circuit, spaced from one another, and arranged on at least one pair of opposite sides of the light panel 11. The two opposite sides of the inner frame perimeter of the light guide frame 12 are in a serrated shape and have a plurality of convex teeth 120, and each of the convex teeth 120 is extended downwardly with a curvature to form a light guide part, so that each of the light guide parts is covered onto each of the first LEDs 110 respectively to receive a beam transmitted from each of the first LEDs 110 and guide the beam to form a side light.

With reference to FIGS. 2 to 13 for the schematic views of the second and third preferred embodiments of the present disclosure, the circular car side LED projection lamp 1 (marker light or stop turn & tail light) is installed onto a car body and used as a warning light. The circular car side LED projection lamp 1 includes a lamp base 10, a light panel 11, a light guide frame 12 and a lamp cover 13. The light panel 11 and the light guide frame 12 are installed in the lamp base 10, and the light guide frame 12 is covered onto the light panel 11, and the lamp cover 13 is covered onto the light panel 11 and the light guide frame 12 and connected to the lamp base 10, and the perimeter of the lamp base 10 has a groove 100 for receiving and connecting a side of the lamp cover 13. The light panel 11 has a drive circuit (not shown in the figure), a plurality of first LEDs 110 and a plurality of second LEDs 111, and the first LEDs 110 are electrically connected to the drive circuit, spaced from one another, and arranged on at least one pair of opposite sides of the light panel (such as the front and rear sides, or the left and right sides of the light panel), and the second LEDs 111 are spaced from one another and arranged in the middle area of the light panel 11. The inner frame perimeter of the light guide frame 12 are in a serrated shape and has a plurality of convex teeth 120, and each of the convex teeth 120 is extended downwardly with a curvature to form a light guide part, so that each of the light guide parts is covered onto each of the first LEDs 110 respectively to receive a beam transmitted by each of the first LEDs 110 and guide the beam to form a side light.

In addition, the lamp cover 13 has a plurality of first mesh dots 130 disposed in the central area of the inner side of the lamp cover 13. For example, the dot shaped mesh dots are configured to be corresponsive to the second LEDs 111 respectively and provided for adjusting the angle of beam emission of the second LEDs 111, and a plurality of engraved marks 131 is distributed and radiated outwardly from the perimeter of the central area and provided for scattering the beam of the first LEDs 110. The lamp cover 13 has a reticulated structure 132 disposed in the central area of the outer side of the lamp cover 13 and configured to be corresponsive to the first mesh dots 130 for further adjusting the transmission angle of the beam of the second LEDs 111. At least one selected from the inner side or outer side of the lamp cover 13, the peripheral side of the light guide frame 12, and the bottom of the light guide part has an optical diamond structure 133 such as the protrusion or recession on the surface to form an optical structure similar to a convex lens structure or a concave lens structure, and the convex optical diamond structure 133 is used to gather and scatter the beam again. The concave the optical diamond structure 133 is used to gather and scatter the beam again to provide the circular projection lighting effect. In addition, a ripple structure 101 is formed at the periphery of the lamp base 10 having the groove 100 and provided for fixing the lamp cover 13 and the lamp base 10 through the ripple structure 101.

Figure 14:
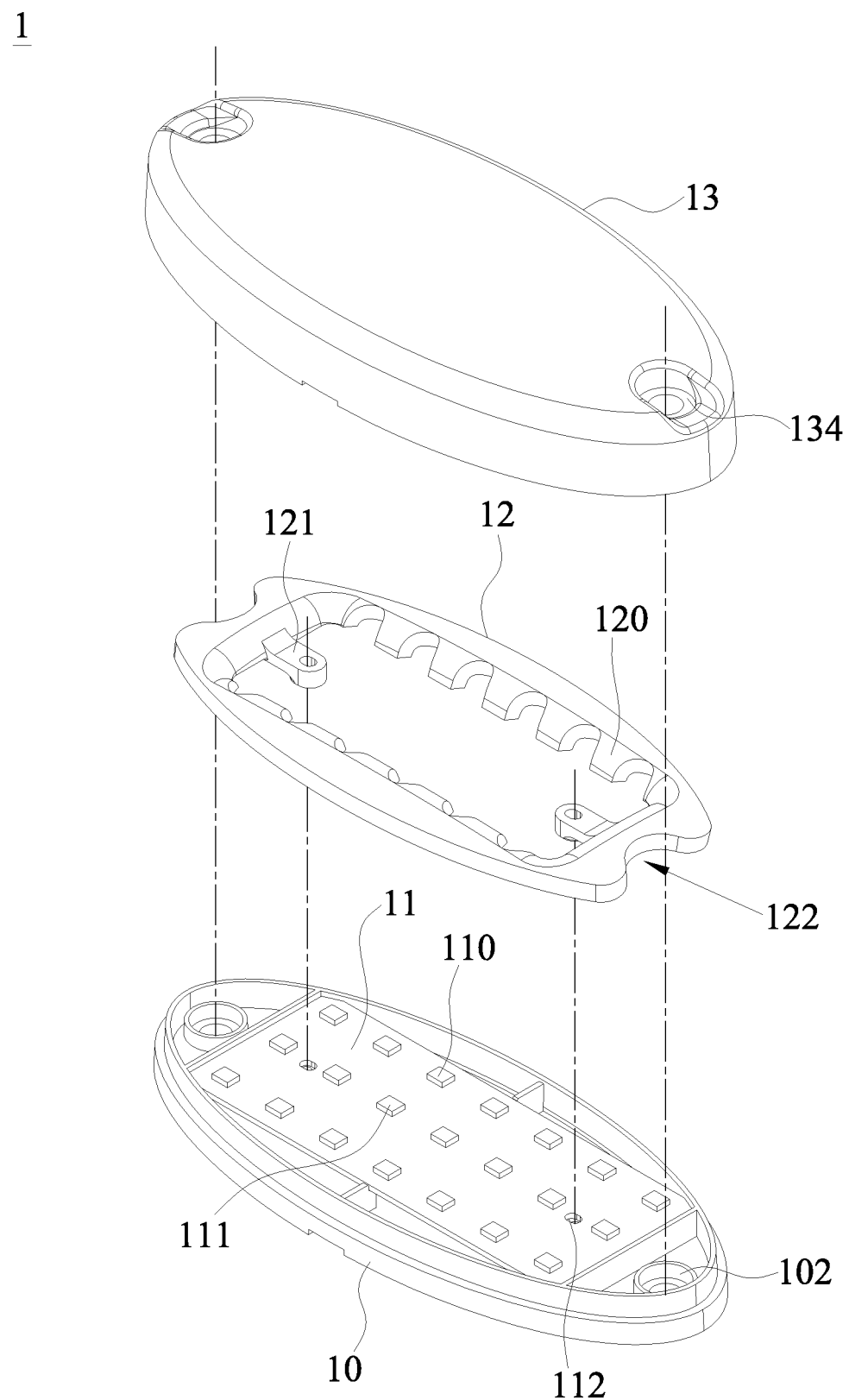
FIG. 14 is a partial exploded view of a fourth preferred embodiment of this disclosure.
Figure 15:
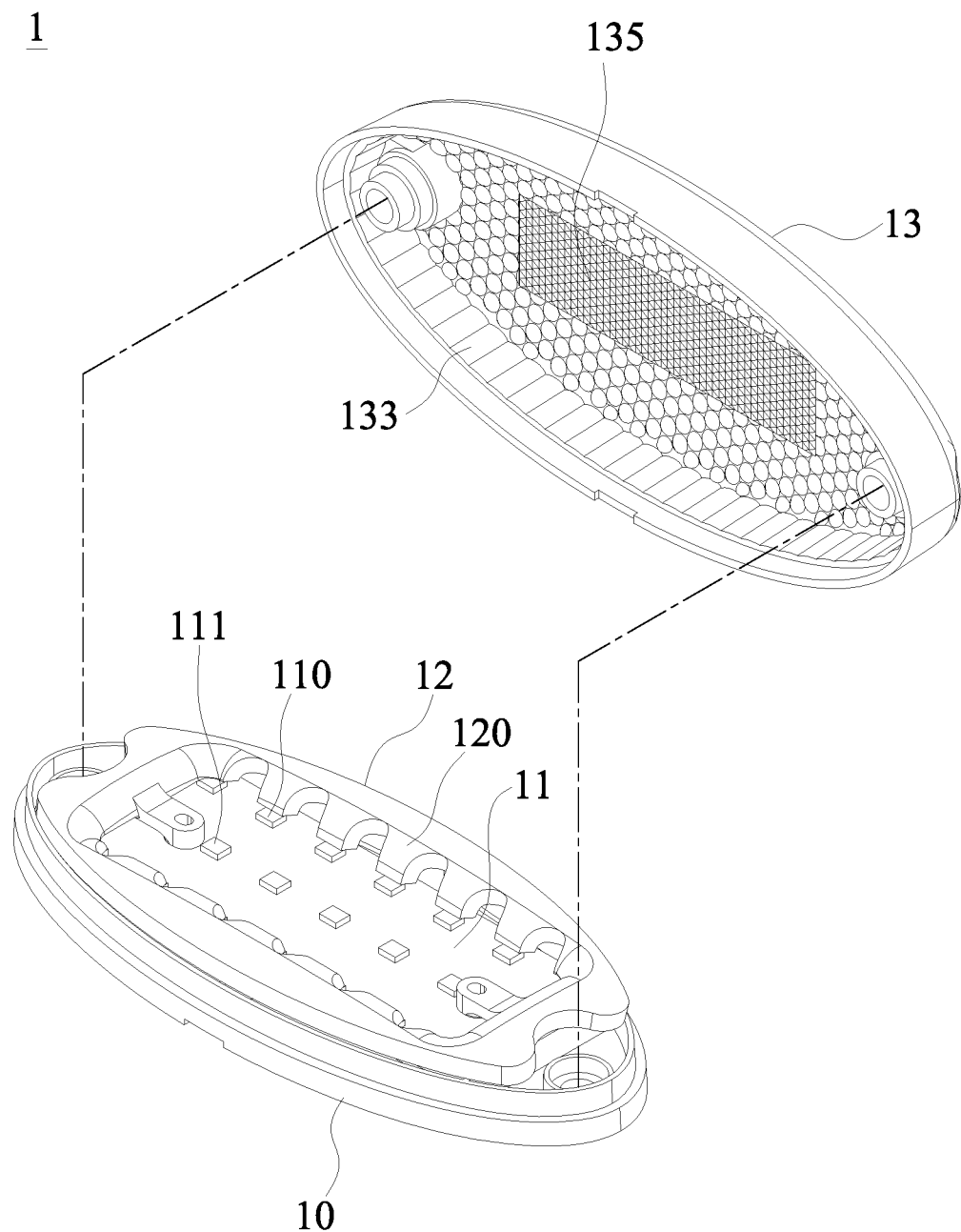
FIG. 15 is another partial exploded view of the fourth preferred embodiment of this disclosure.

In a further embodiment as shown in FIGS. 14 and 15, the circular car side LED projection lamp 1 (marker light or stop turn & tail light) is in an elliptical shape, and the first LEDs 110 are spaced from one another and arranged on one pair of opposite sides of the light panel, and the light guide frame 12 can be extended to form at least one combination portion 121, and the light panel 11 and the lamp base 10 have a first combination hole 112 and a second combination hole (not shown in the figure) configured to be corresponsive to the combination portion 121 respectively and provided for locking and fixing the light guide frame 12, the light panel 11 and the lamp base 10 with one another. The lamp cover 13 has at least one first assembling hole 134, and the lamp base 10 has a second assembling hole 102 configured to be corresponsive to the first assembling hole 134, and the first and second assembling holes 134, 102 are provided for locking and fixing the lamp cover 13 and the lamp base 10 with each other. In addition, a recessed portion 122 is formed at the outer frame perimeter of the light guide frame 12 and configured to be corresponsive to the first assembling hole 134. The internal central area of the lamp cover 13 has a plurality of second mesh dots 135 which may be in a dot shape, or in a hexagonal cone shape and disposed in the central area of the lamp cover 13 and configured to be corresponsive to the second LEDs 111 respectively, and the rest of the second mesh dots 135 are still in the dot shape, for scattering the beam of the first LEDs 110.

What is claimed is:

1. A circular car side LED projection lamp, installed onto a car body and used as a warning light, comprising:
   a lamp base;
   a light panel, installed in the lamp base, and having a drive circuit and a plurality of first LEDs electrically coupled to the drive circuit and spaced from one another and arranged on at least one pair of opposite sides of the light panel respectively;
   a light guide frame, installed in the lamp base and covered onto the light panel, and the two opposite sides of an inner frame perimeter of the light guide frame being configured to be in a serrated shape and having a plurality of convex teeth, and each of the convex teeth extending downward with a curvature to form a light guide part, so that each of the light guide parts is covered onto each of the first LEDs to receive a beam emitted by each of the first LEDs and guide the beam to provide a side light; and
   a lamp cover, covered onto the light panel and the light guide frame, and coupled to the lamp base;
   wherein the light panel further comprises a plurality of second LEDs spaced from one another and arranged in a middle area of the light panel;
   wherein the lamp cover has a plurality of first mesh dots disposed in a central area of an inner side thereof and configured to be corresponsive to the second LEDs respectively, and a plurality of engraved marks radiating outwardly from a perimeter of the central area.

2. The circular car side LED projection lamp according to claim 1, wherein at least one selected from a side of the lamp cover, a peripheral side of the light guide frame, and the bottom of the light guide part has an optical diamond structure for scattering the beam of the first LEDs.

3. The circular car side LED projection lamp according to claim 2, wherein the optical diamond structure is a convex lens structure.

4. The circular car side LED projection lamp according to claim 1, wherein the lamp cover has a reticulated structure disposed in a central area of an outer side thereof and configured to be corresponsive to the first mesh dots.

5. The circular car side LED projection lamp according to claim 4, wherein the lamp base having a groove has a ripple structure disposed at a periphery of the lamp cover and fixed to the lamp base through the ripple structure.

6. The circular car side LED projection lamp according to claim 1, wherein the lamp cover has a plurality of second mesh dots disposed on the central area of the inner side.

7. The circular car side LED projection lamp according to claim 6, wherein the second mesh dots disposed in the central area of the lamp cover are in a hexagonal cone shape and configured to be corresponsive to the second LEDs respectively, and the rest of the second mesh dots are in a dot shape.

8. The circular car side LED projection lamp according to claim 7, wherein the light guide frame is extended to form at least one combination portion, and the light panel and the lamp base have a first combination hole and a second combination hole configured to be corresponsive to the combination portion respectively and provided for locking and fixing the light guide frame, the light panel and the lamp base with one another.

9. The circular car side LED projection lamp according to claim 8, wherein the lamp cover has at least one first assembling hole, and the lamp base has a second assembling hole configured to be corresponsive to the first assembling hole, and the first assembling hole and the second assembling hole are provided for fixing the lamp cover and the lamp base with each other, and a recessed portion is formed at an outer frame perimeter of the light guide frame and configured to be corresponsive to the first assembling hole.

* * * * *